United States Patent [19]
Blodgett et al.

[11] 3,971,321
[45] July 27, 1976

[54] FLUID DRIVEN ELECTRICAL-MECHANICAL SAFETY AND ARMING SYSTEM

[75] Inventors: Francis E. Blodgett, Silver Spring; Carl J. Campagnuolo, Potomac, both of Md.

[73] Assignee: The United States of America as represented by the Secretary of the Army, Washington, D.C.

[22] Filed: Sept. 6, 1974

[21] Appl. No.: 503,999

[52] U.S. Cl............................ 102/81; 102/70.2 GA; 310/21; 310/25
[51] Int. Cl.²....................... F42C 5/00; H02K 7/06
[58] Field of Search.......... 102/49.6, 49.7, 70.2 GA, 102/81; 310/15, 21, 22, 25

[56] References Cited
UNITED STATES PATENTS

| | | | |
|---|---|---|---|
| 2,985,777 | 4/1961 | Merchant.............................. | 310/21 |
| 3,362,332 | 11/1968 | Campagnuolo....................... | 102/81 |
| 3,568,704 | 3/1971 | Campagnuolo et al............... | 310/15 |

*Primary Examiner*—Samuel W. Engle
*Assistant Examiner*—S. A. Cangialosi
*Attorney, Agent, or Firm*—Nathan Edelberg; Robert P. Gibson; Saul Elbaum

[57] ABSTRACT

This invention relates to an ordnance fuzing device in general and more particularly to a fluidically driven safety and arming mechanism. The present invention also utilizes a fluidically driven electrical generating means capable of transforming pressure energy of a certain magnitude into useable electric energy.

The present device comprises an enclosed volume defining a resonant cavity having an annular column of fluid directed toward such cavity so as to produce oscillations therein. A rod connected to a diaphragm of the cavity senses the oscillations of the cavity and causes a mass located at the tip of the rod to undergo translational motion of an elliptical pattern and thereby to drive a cylindrical smooth gear which is disposed adjacent the mass, such that the elliptical motion of the mass rotates the gear. As an additional feature, the invention further provides for a flexible reed which is joined to the rod to transfer oscillations to a magnetic field so as to produce useable electrical energy.

4 Claims, 2 Drawing Figures

FLUID DRIVEN ELECTRICAL-MECHANICAL SAFETY AND ARMING SYSTEM

RIGHTS OF GOVERNMENT

The invention described herein may be manufactured, used and licensed by or for the United States government, for governmental purposes, without the payment to me of any royalty thereof.

BACKGROUND OF THE INVENTION

This invention relates to an ordnance fuzing device and more particularly to a fluidic safety and arming mechanism capable of driving a smooth tapered gear by the use of fluidically induced oscillations within a cavity.

It is essential in many ordinance applications to provide the missile with a safety mechanism to preclude detonation until a certain minimum distance from the launching site is achieved. Prior safety and arming mechanisms have relied primarily upon mechanical and electrical means for arming the missile and for detonating it at a certain time or height above the target. The mechanical and electronic systems commonly used for such purposes are subject to severe shock, vibrations, pressure and temperature extremes encountered by the missile during launch and in flight. The fluidic system of the present invention is ideally suited to withstand such severe environmental conditions because it has no moving parts and utilizes environmental signatures for its actuation and operation.

It is also apparent that the power supplies utilized in such missile systems must be capable of withstanding severe shock and vibration. Such power supplies must be storeable over long periods of time without deterioration, while being activated only when needed in flight. Known chemical and mechanical power supplies often do not satisfactorily meet the aforesaid requirements. The fluidic system of the present invention is made impervious to such disturbances by employing the fluidic source of electrical energy which converts pneumatic energy to electrical energy which is activated only after a preset time from launching.

Fluidic generators, per se, are known in the art. Examples of such fluidic generators can be seen in the prior art patents to Carl J. Campagnuolo, U.S. Pat. No. 3,539,840, as well as in U.S. Pat. No. 3,772,541 to Compagnuolo and Horton.

It is, therefore, an object of the present invention to provide a fluidic safety and arming mechanism which activates a weapon carrying missile only at a safe distance away from the launching area.

It is another object of the present invention to provide a fluidic detonating means for a weapon carrying missile.

A further object is to provide means to arm and detonate a weapon carrying missile that is insensitive to high speeds, shock, vibration and environmental temperature and pressure extremes.

Still another object of the present invention is to simultaneously provide means to convert a fluidic pressure signal into the useable electrical voltage.

An additional object of the invention is to provide means to arm and detonate a weapon carrying missile that is responsive solely to two external environmental signatures.

An additional object is to provide a safety and arming mechanism which causes very little mechanical loading to the generator and in which the power and frequency remain relatively constant over the desired pressure range.

Additional objects include the desire to provide a good mechanical impedance match in a compact, rugged and simple arrangement.

SUMMARY OF THE INVENTION

Briefly, in accordance with this invention, the fluidically driven safety and arming mechanism is provided which comprises an enclosed volume defining a resonant cavity and associated with means for directing a column of fluid toward the open end of such cavity. The closed end of the cavity is provided with a flexible diaphragm which is responsive to the oscillations within the cavity. A rod is connected to the diaphragm for transmitting such oscillations to a mass attached at the tip end of the rod such that the oscillations within the cavity are transmitted to the rod to drive the mass in an elliptical translational pattern. A cylindrical smooth gear is disposed adjacent the mass such that the translational motion of the mass causes the gear to turn and therein to activate a safety and arming mechanism in the usual manner.

As an additional feature, the invention further includes a flexible reed which is joined perpendicularly to the rod to receive its oscillations. Oscillations of the reed within a magnetic field causes the production of electrical energy for use within the missile system.

BRIEF DESCRIPTION OF THE DRAWINGS

The specific nature of the invention as well as other objects, aspects, uses and advantages thereof will clearly appear from the following description and from the accompanying drawings in which.

DESCRIPTION OF THE PREFERRED EMBODIMENT

Figure 1:
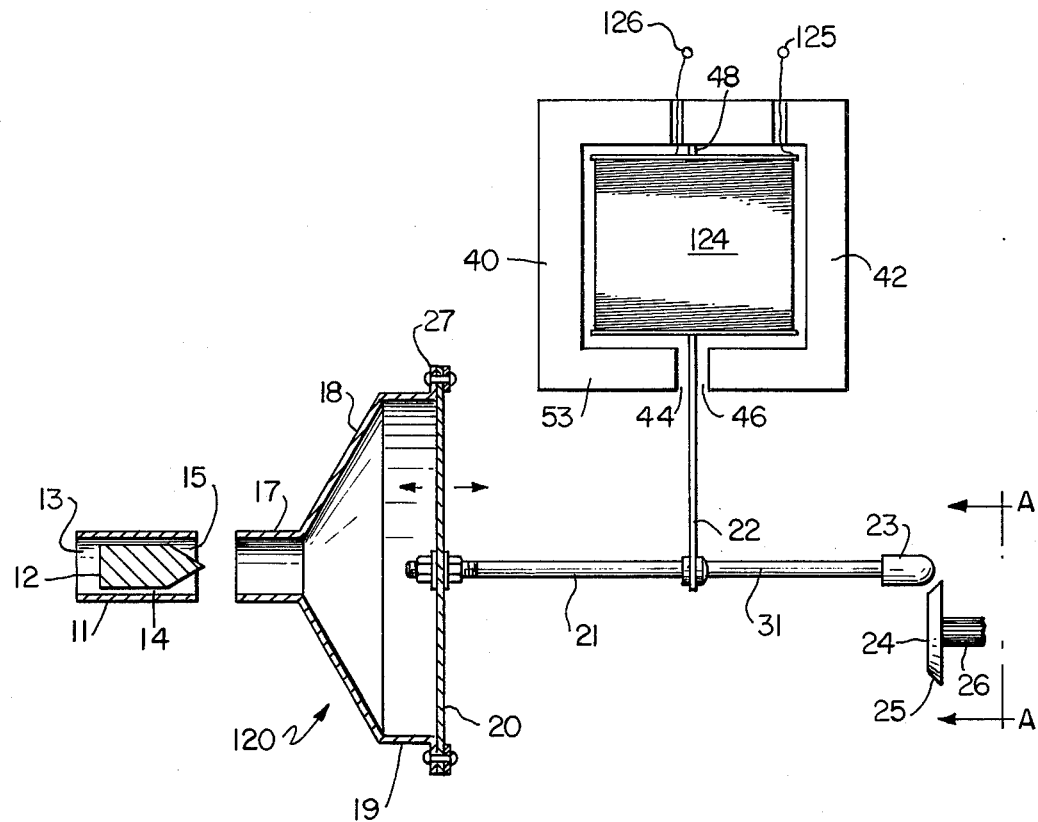
FIG. 1 shows the fluidic safety and arming mechanism of the present invention.

Referring now to FIG. 1, air, which is the fluid power of the generator, enters a port 13 formed by a cylinder 11. A cylindrical plug 12 is centrally located within cylinder 11 such as to form an annular orifice 14 which causes an annular column of air to be directed from exit port 15 to the opening 18 of a Helmholtz resonator 120. Helmholtz resonator 120 has a hollow cylindrical section 17 which communicates its entrance port with a conically shaped section 18. Integral with conically shaped section 18 is a base portion 19 which consists of a cylindrical section having a constant cross sectional area. A diaphragm 20 having the same frequency as the Helmholtz resonator is attached to end 27 of section 19 of the resonator. Attached by conventional means to the center portion of diaphragm 20 is a connecting rod 21.

A soft iron reed 22 is joined to connecting rod 21. Reed 22 extends into an electrical coil 124 and is positioned to pivot at end 48 within a permanent magnet 53 which surrounds the electrical coil. Permanent magnet 53 has two pole pieces 40 and 42 of opposite polarity and air gaps 44 and 46 are formed between reed 22 and pole pieces 42 and 40. Output wires 125 and 126 are part of the electrical coil 124 and extend through to top of permanent magnet 53. The general operation of the electrical generators is fully described in the aforementioned prior art patents.

Referring back to rod 21, an extension rod 31 is connected thereto and is provided at its tip with the mass 23. Disposed adjacent mass 23 is a cylindrical smooth gear 24 having tapered ends 25 and a conventional tooth gear 26 centrally attached thereto.

In operation, air enters the generator at entrance port 13 and is converted into an annular column of air by virtue of annular orifice 14. The column of air will spread and impinge upon the edge of cylindrical section 17 and will produce a multiple frequency edgetone or ringtone in a well known manner. The oscillation of the annular column of air will cause resonance within the cavity and will in turn cause in and out oscillations of diaphragm 20.

This pulsating motion of diaphragm 20 will be transmitted to rod 21, reed 22, rod 31 and mass 23. The oscillatory motion of reed 22 within a magnetic field will produce electrical energy in a manner which is well described in the aforementioned prior art patents. The pulsating motion of diaphragm 20 causes rods 21 and 31 to also pulsate and impart to mass 23 a translational motion by virtue of the mechanical unbalance of the rod.

Figure 2:
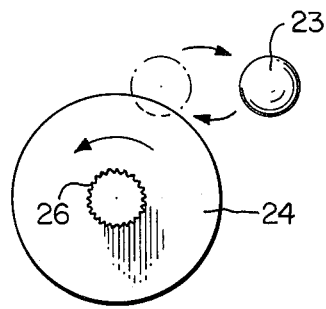
FIG. 2 is a view along lines A—A of FIG. 1 illustrating the elliptical motion of the mass which is driven by the fluidic oscillations within the cavity.

More particularly, rod 31 is constrained by a fixed length which causes mass 23 to describe an elliptical pattern as can be more readily ascertained from FIG. 2. The elliptical motion of mass 23 is described in FIG. 2 such that its interaction with smooth tapered gear 24 causes the gear to turn counterclockwise whereas the mass 23 engages in a clockwise elliptical pattern. The reason for such motion can be understood because the downward motion of rod 31 imparts a force to the tapered edge 25 (which is tapered at about 20°) which force drives the gear in a direction opposite to the elliptical motion of the mass 23. It is the downward force of mass 23 physcially engaging the tapered edge 25 of gear 24 which actually causes the turning of the gear. In its upward stroke, rod 31 recedes from the gear only to come down again and repeat its previously described motion. Because of the high frequency of the generator, the gear is run in a very smooth transverse direction. The motion of mass 23 is, therefore, the result of a vibrating cantilever function which is generated by the pulsating motion of flexible diaphragm 20. It is interesting to note that the same motion can also be obtained by imparting a sine wave signal to the coil assembly 124 and driving the coil at resonance.

It will be apparent from the foregoing that the invention described herein is capable of fluidically driving a safety and arming mechanism while simultaneously producing useable electrical energy. Significant also is the feature that two independent environmental signatures are required prior to arming. The first signature being the activation of oscillations within Helmholtz resonator 120 and the second signature being the actuation of the safety and arming mechanism by virtue of the driving tapered gear 24 by the elliptical motion of mass 23.

We claim as our invention:

1. A fluidically actuated safety and arming mechanism comprising:
   resonant means having a fluid input port and a diaphragm output for oscillating said diaphragm at a resonant frequency;
   a linear rod mounted at one end to said diaphragm axially extending substantially perpendicular therefrom and having a mass mounted on its other end;
   a smooth surface gear capable of rotation positioned adjacent the other end of said rod such that axial motion of said rod at said one end produced by oscillation of said diaphragm becomes elliptical motion of said mass in a plane perpendicular to said rod at said other end by engaging said gear, said elliptical motion at said other end causes said gear to rotate; and,
   a reed mounted at one end to said rod to move therewith and means associated with the other end of said reed for producing electrical energy from the movement of said reed.

2. The mechanism of claim 1 wherein said gear rotates about an axis parallel to the axis of said rod.

3. The mechanism of claim 2 wherein said gear has a tapered edge and said mass contacts said gear at said tapered edge.

4. The mechanism of claim 1 wherein rotation of said gear operates said safety and arming mechanism.

* * * * *